US012585105B2

(12) United States Patent
Samanta et al.

(10) Patent No.: US 12,585,105 B2
(45) Date of Patent: Mar. 24, 2026

(54) APPARATUS, METHODS AND COMPUTER PROGRAMS FOR PROVIDING CONTROL SIGNALS FOR LASER SCANNING SYSTEMS

(71) Applicant: Astranu Inc., San Mateo, CA (US)

(72) Inventors: Bibek Samanta, Piscataway, NJ (US); Michael Eggleston, Columbus, OH (US); Flavio Pardo, Glen Gardner, NJ (US)

(73) Assignee: Astranu Inc., San Mateo, CA (US)

( * ) Notice: Subject to any disclaimer, the term of this patent is extended or adjusted under 35 U.S.C. 154(b) by 915 days.

(21) Appl. No.: 17/737,742

(22) Filed: May 5, 2022

(65) Prior Publication Data

US 2022/0365336 A1 Nov. 17, 2022

(51) Int. Cl.
| | |
|---|---|
| *G02B 26/08* | (2006.01) |
| *G01S 7/481* | (2006.01) |
| *G01S 17/89* | (2020.01) |
| *G01B 9/02091* | (2022.01) |

(52) U.S. Cl.
CPC ........ *G02B 26/0833* (2013.01); *G01S 7/4817* (2013.01); *G01S 17/89* (2013.01); *G01B 9/02091* (2013.01)

(58) Field of Classification Search
CPC . G02B 26/0833; G02B 26/105; G01S 7/4817; G01S 17/89; G01B 9/02091
See application file for complete search history.

(56) References Cited

U.S. PATENT DOCUMENTS

| | | | |
|---|---|---|---|
| 5,438,416 | A | 8/1995 | Nater |
| 7,924,486 | B2 | 4/2011 | Yen et al. |
| 8,059,322 | B1 | 11/2011 | Brown |
| 9,194,703 | B2 | 11/2015 | Entringer et al. |
| 10,078,133 | B2 | 9/2018 | Dussan |
| 10,473,784 | B2 | 11/2019 | Puglia |
| 2009/0237627 | A1 | 9/2009 | Kobori et al. |
| 2010/0066275 | A1 | 3/2010 | Giebel et al. |

(Continued)

FOREIGN PATENT DOCUMENTS

| | | |
|---|---|---|
| CN | 1455883 A | 11/2003 |
| CN | 103376706 A | 10/2013 |

(Continued)

OTHER PUBLICATIONS

Office action received for corresponding European Patent Application No. 21173839.8, dated Sep. 5, 2024, 7 pages.

(Continued)

*Primary Examiner* — Euncha P Cherry
(74) *Attorney, Agent, or Firm* — Scale LLP

(57) ABSTRACT

Examples of the disclosure relate to apparatus for providing control signals to an adjustable mirror in optical systems such as laser scanning systems. The optical systems could be LiDAR systems or optical coherence tomography (OCT) systems or any other suitable systems. The apparatus comprises means for providing a control signal to at least one adjustable mirror to control movement of the at least one adjustable mirror where the at least one adjustable mirror is provided within a laser scanning system. The control signal comprises a multi-step signal where step widths of the multi-step signal are based on half of a period of oscillation of the at least one adjustable mirror.

20 Claims, 5 Drawing Sheets

(56)     References Cited

U.S. PATENT DOCUMENTS

Figure 1:
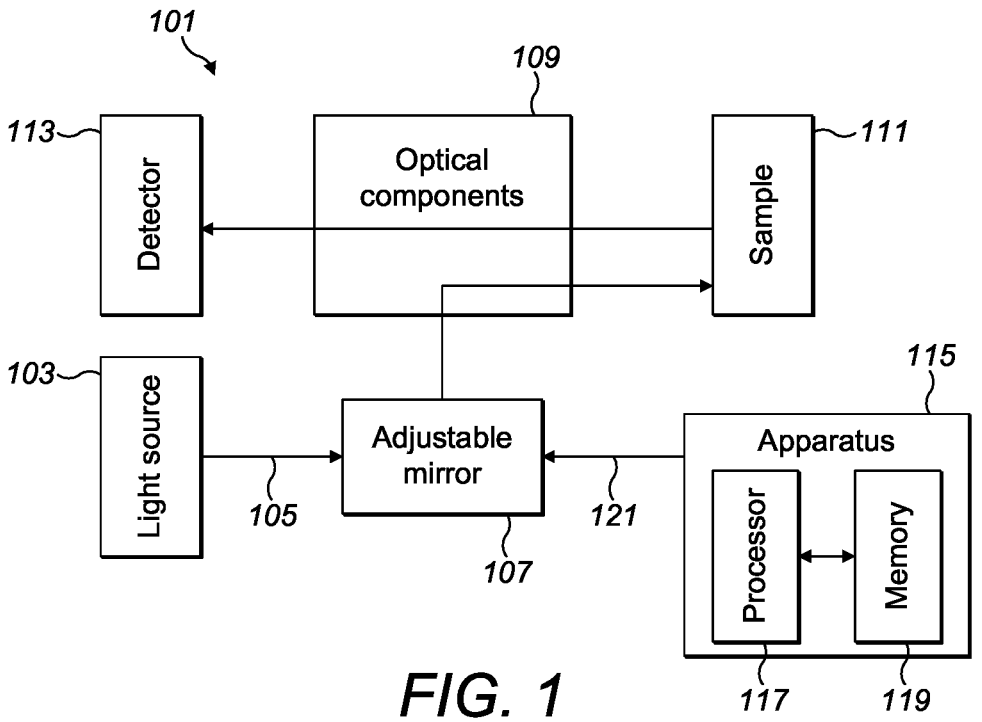

| | | | |
|---|---|---|---|
| 2011/0170156 A1 | 7/2011 | Takayama | |
| 2018/0065149 A1 | 3/2018 | Morikawa et al. | |
| 2019/0293925 A1 | 9/2019 | Yamada | |
| 2019/0324266 A1 | 10/2019 | Hayashi | |
| 2019/0373140 A1 | 12/2019 | Gudaitis et al. | |
| 2020/0403626 A1* | 12/2020 | Stelzer | G02B 26/0833 |
| 2021/0389586 A1 | 12/2021 | Pardo | |
| 2022/0057626 A1* | 2/2022 | Wang | G02B 26/0858 |

FOREIGN PATENT DOCUMENTS

| | | | |
|---|---|---|---|
| CN | 107615133 A | 1/2018 |
| CN | 109521557 A | 3/2019 |
| CN | 110140020 A | 8/2019 |
| CN | 110519663 A | 11/2019 |
| CN | 112130164 A | 12/2020 |
| DE | 102018120097 A1 | 2/2020 |
| EP | 2645148 A1 | 10/2013 |
| EP | 3460472 A1 | 3/2019 |
| EP | 3530175 A1 | 8/2019 |
| EP | 3593708 A1 | 1/2020 |
| EP | 3644031 A1 | 4/2020 |
| EP | 3671108 A1 | 6/2020 |
| EP | 3780381 A1 | 2/2021 |
| JP | 2016150818 A | 8/2016 |
| JP | 2018155784 A | 10/2018 |
| WO | 02/37163 A1 | 5/2002 |
| WO | 2010/035537 A1 | 4/2010 |
| WO | 2018/125633 A1 | 7/2018 |
| WO | 2019/162576 A1 | 8/2019 |
| WO | 2021/105788 A1 | 6/2021 |

OTHER PUBLICATIONS

Office action received for corresponding Chinese Patent Application No. 202210529435.X, dated Sep. 11, 2024, 10 pages of office action and 7 pages of office action translation available.

"C2110 Datasheet V1.0", Zhisensor, Xi'an ZhiSensor Technologies Co Ltd, 2020, 7 pages.

Imboden et al., "High speed control of electro-mechanical transduction Advanced Drive Techniques for Optimized Step-and-Settle Response of MEMS Micromirrors", arXiv, 2016, pp. 1-37.

Li et al., "Modelling and Experimental Verification of Step Response Overshoot Removal in Electrothermally-Actuated MEMS Mirrors", Micromachines, vol. 8, No. 10, 2017, pp. 1-11.

Samanta et al., "Low-cost Electrothermally Actuated MEMS Mirrors for High-Speed 3D Laser Scanning Applications", IEEE Photonics Conference (IPC), Oct. 18-21, 2021, 2 pages.

Poik et al., "A Mechatronic Lock-In Amplifier: Integrating Demodulation in Sensor Electronics for Measuring Mechanical Oscillations", IEEE Transactions on Instrumentation and Measurement, vol. 70, Dec. 24, 2020, 8 pages.

European Application No. 21172440.6, "Apparatus for Positioning Components in Optical Systems", filed on May 6, 2021, pp. 1-23.

Extended European Search Report received for corresponding European Patent Application No. 21173839.8, dated Nov. 2, 2021, 10 pages.

Office action received for corresponding Chinese Patent Application No. 202210529435.X, dated Mar. 22, 2025, 6 pages of office action and 3 pages of office action translation available.

Yaobo et al., "Design and Modes of a Novel Two-Dimensional Microscanner with Electrostatic Actuation", Acta Optica Sinica, vol. 33, No. 06, Jun. 2013, pp. 1-6.

Office action from corresponding EP Application No. 21173839.8 dated Dec. 12, 2025.

\* cited by examiner

APPARATUS, METHODS AND COMPUTER PROGRAMS FOR PROVIDING CONTROL SIGNALS FOR LASER SCANNING SYSTEMS

RELATED APPLICATION

This application claims priority to the European patent application number 21173839.8, filed on May 14, 2021, the content of which is incorporated herein by reference in its entirety.

TECHNOLOGICAL FIELD

Examples of the disclosure relate to apparatus, methods and computer programs for providing control signals for laser scanning systems. Some relate to apparatus, methods and computer programs for providing control signals to one or more adjustable mirrors within laser scanning systems.

BACKGROUND

Laser scanning systems such as LiDAR systems and OCT systems comprise moveable components such as one or more adjustable mirrors. When a control signal is provided to the moveable components this can lead to a transient response or ringing. This ringing adversely affects the accuracy with which the laser scanning systems can operate.

BRIEF SUMMARY

According to various, but not necessarily all, examples of the disclosure there is provided an apparatus comprising means for:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

The means may be for determining a period of oscillation of the at least one adjustable mirror and using the determined period to control the step widths of the control signal.

The period of oscillation may be determined based on measurements of mechanical resonance of the at least one adjustable mirror.

The control signal may comprise more than two steps.

The means may be for forming the control signal based on a multi-pulse drive signal.

The multi-pulse drive signal may comprise a pulse-width modulated drive signal.

The step widths of the control signal may be substantially half the period of oscillation of the at least one adjustable mirror.

The means may be for using a feedback loop to adjust at least one of; step sizes of the control signal, step widths of the control signal.

The means may be for adjusting one or more step widths of the control signal separately to one or more other step widths of the control signal.

The means may be for filtering the control signal before it is provided to the at least one adjustable mirror.

The control signal may be provided to one or more actuators of the at least one adjustable mirror to control movement of the at least one adjustable mirror.

The movement of the at least one adjustable mirror may enable linear scanning of the laser scanning system.

The at least one adjustable mirror comprises a microelectromechanical system mirror.

The laser light may comprise collimated light.

According to various, but not necessarily all, examples of the disclosure there may be provided an apparatus comprising at least one processor; and at least one memory including computer program code, the at least one memory and the computer program code configured to, with the at least one processor, cause the apparatus at least to perform:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

According to various, but not necessarily all, examples of the disclosure there may be provided an optical coherence tomography device comprising an apparatus as described herein.

According to various, but not necessarily all, examples of the disclosure there may be provided a LiDAR device comprising an apparatus as described herein.

According to various, but not necessarily all, examples of the disclosure there may be provided a method comprising:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

According to various, but not necessarily all, examples of the disclosure there may be provided a computer program comprising computer program instructions that, when executed by processing circuitry, cause:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

BRIEF DESCRIPTION

Figure 2:
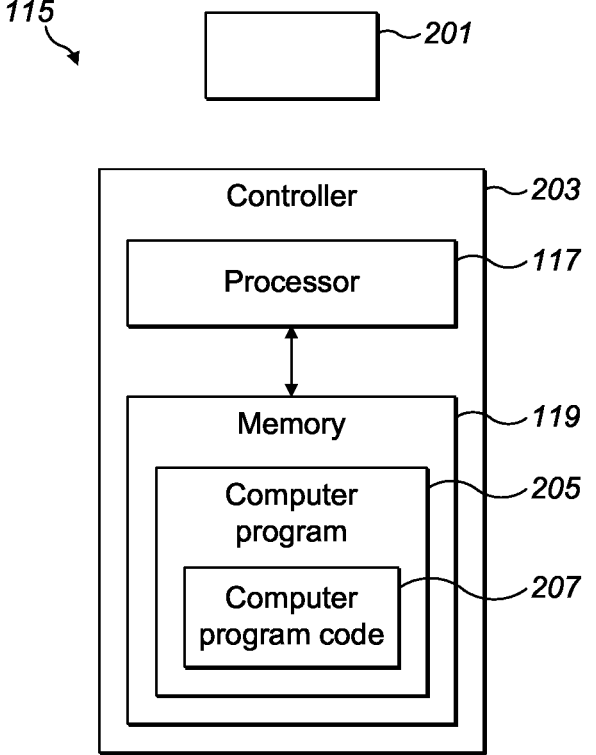
Figure 3:
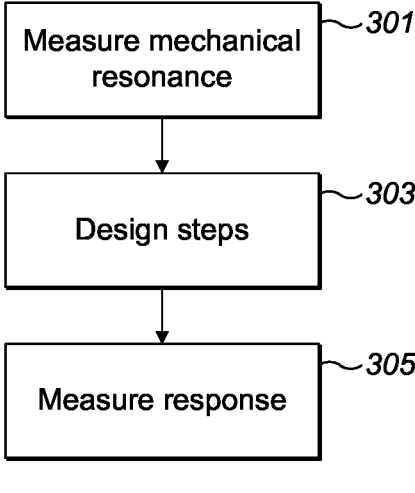
Figure 4:
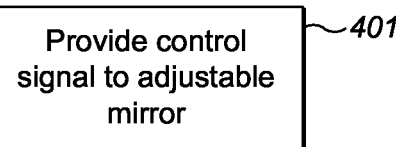
Figure 5C:
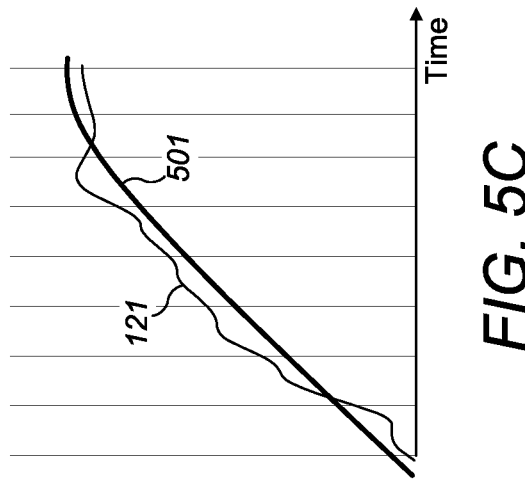
Figure 5B:
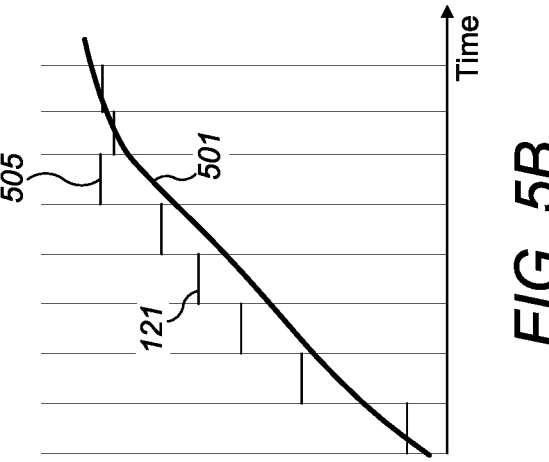
Figure 5A:
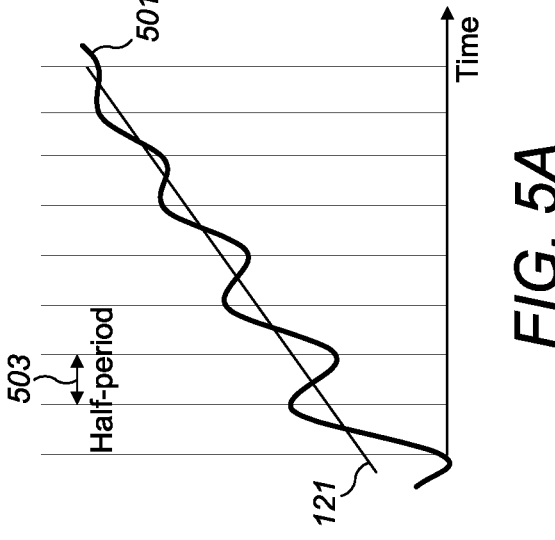
Figure 6:
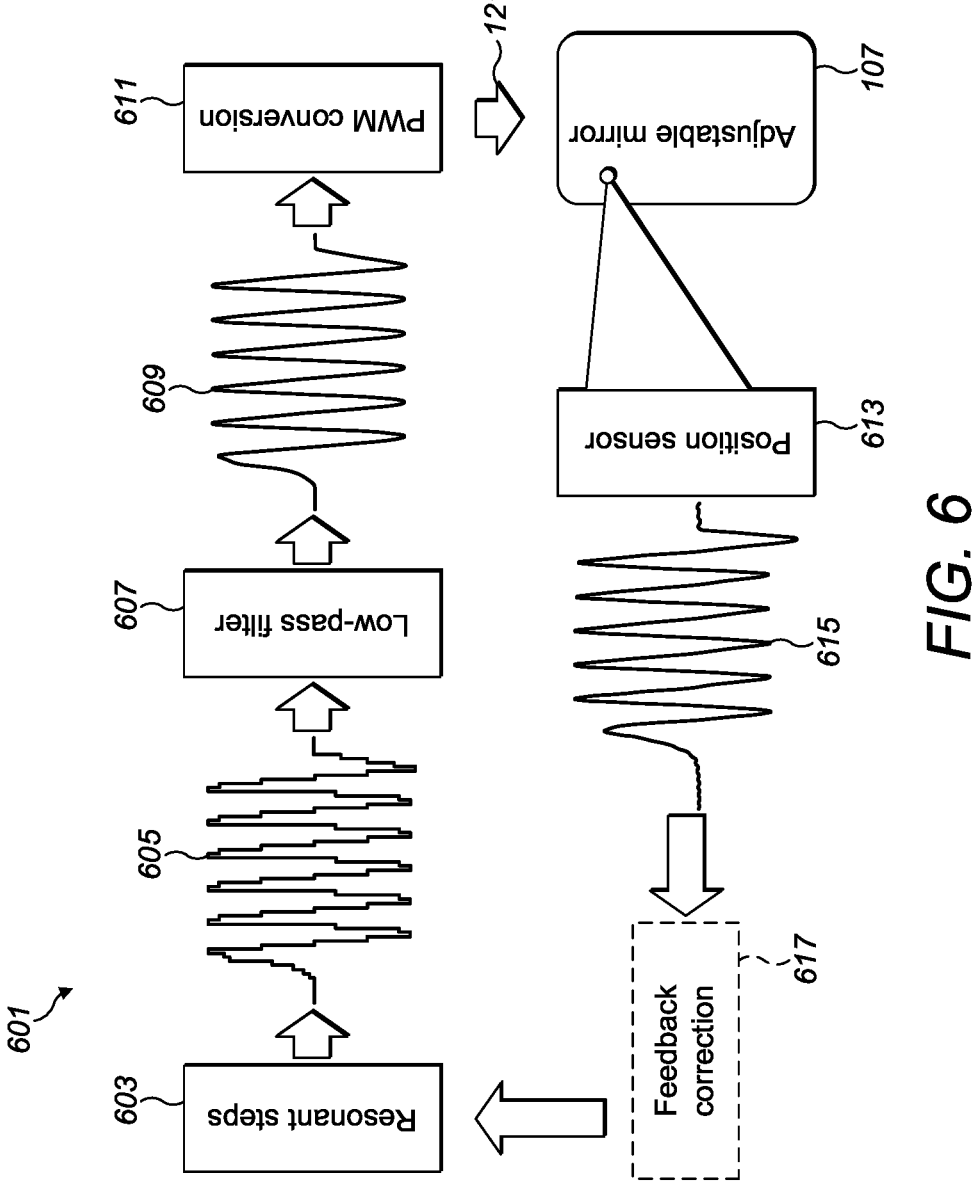
Figure 7:
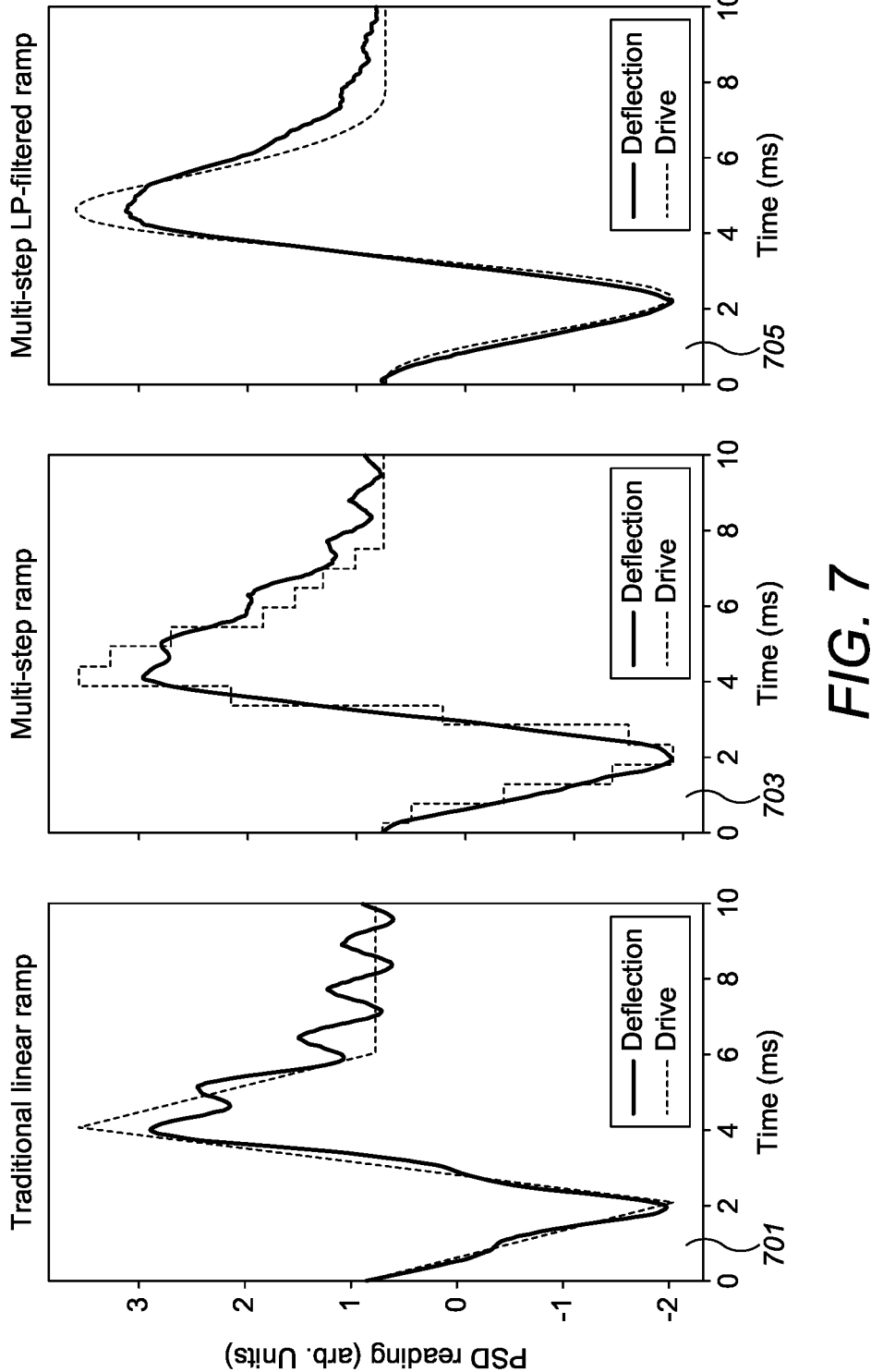

Some examples will now be described with reference to the accompanying drawings in which:

FIG. 1 shows an example system;
FIG. 2 shows an example apparatus;
FIG. 3 shows an example method;
FIG. 4 shows an example method;
FIG. 5A shows example control signals;
FIG. 5B shows further example control signals;
FIG. 5C shows further example control signals;
FIG. 6 shows an example feedback loop; and
FIG. 7 shows example results.

DETAILED DESCRIPTION

Examples of the disclosure relate to apparatus for providing control signals to an adjustable mirror in optical systems such as laser scanning systems. The optical systems could be LiDAR systems or optical coherence tomography (OCT) systems or any other suitable systems. The control signal is configured to reduce ringing or transient response oscillations. This reduction in the ringing can allow for faster and more efficient linear scanning.

FIG. 1 shows an example system 101 in which examples of the disclosure could be implemented. The example system 101 could be a LiDAR system or an OCT system or any other system that uses a scanning laser or other collimated light source to obtain images or other information from a sample 111. The LiDAR systems and OCT systems could be provided within consumer devices such as smartphones or tablets. In some examples the LiDAR systems or OCT systems could be provided within other types of devices such as medical imaging devices, vehicles or any other suitable types of devices.

The sample 111 can comprise any object or part of an object that is to be scanned by the system 101. The type of sample 111 that is being used can depend on the type of system 101 that is being used. For example, if the system 101 is an OCT system then the sample 111 could comprise a part of a subject's body and the laser light could be used to obtain images or other information from the subject's body. If the system 101 is a LiDAR system then the sample 111 could be any object that is positioned in the environment around the system 101. For example, if the LiDAR system is used in a vehicle the sample 111 could be other vehicles or pedestrians or other objects around the vehicle.

The example system 101 shown in FIG. 1 comprises a light source 103, at least one adjustable mirror 107, one or more optical components 109, at least one detector 113 and an apparatus 115. The apparatus 115 can be configured to control the system 101. It is to be appreciated that only components that are referred to in the following description are shown in FIG. 1 and that the system 101 can comprise additional components in examples of the disclosure.

The light source 103 can comprise a laser light source configured to provide a beam of laser light 105. The laser light source 103 can be configured to provide a beam of laser light 105 at any wavelength suitable for scanning the sample 111. The wavelength of light that is used can depend on the type of sample 111 that is to be scanned, the type of system 101 that is provided or any other suitable factor. In other examples collimated light could be provided.

The system 101 is configured so that, when the system 101 is in use, the beam of laser light 105 from the light source 103 is incident on the at least one adjustable mirror 107. A light guide can be used to provide the laser light 105 from the light source 103 to the adjustable mirror 107.

The at least one adjustable mirror 107 can comprise any reflective or partially reflective means. The adjustable mirror 107 can comprise a Microelectromechanical system (MEMS) mirror, a thermally controlled mirror or any other suitable type of reflective surface.

The at least one adjustable mirror 107 is positioned within the system 101 so that when the system 101 is in use at least some of the laser light 105 reflected by the at least one adjustable mirror 107 is directed towards the sample 111 and so can be used for scanning of the sample 111.

The adjustable mirror 107 is adjustable in that the position of the adjustable mirror 107 can be adjusted so as to enable the laser light 105 to be directed towards different parts of the sample 111. The adjustable mirror 107 can be coupled to one or more actuators to allow for movement of the adjustable mirror 107. The actuators can comprise one or more springs or any other suitable means.

The adjustments of the adjustable mirror 107 can comprise changing the angular position of the adjustable mirror 107 within the system 101 and/or any other suitable changes in position. The adjustable mirror 107 can be configured to be tilted through a range of different angular positions.

The movement of the adjustable mirror 107 can enable different parts of the sample 111 to be scanned. The position of the adjustable mirror 107 can be controlled by a control signal 121 to enable different parts of the sample 111 to be scanned. The adjustable mirror can be configured to direct laser light 105 onto different parts of the sample 111. The adjustable mirror 107 can be configured to allow for linear scanning of the sample 111.

An apparatus 115 is configured to provide a control signal 121 to the adjustable mirror 107. The apparatus 115 can comprise a controller or any other suitable means. The apparatus 115 can comprise a processor 117 and a memory 119. An example apparatus 115 is shown in FIG. 2 and described below.

The control signal 121 comprises a signal that imparts a force or acceleration to the actuators of the adjustable mirror 107. The control signal 121 can comprise a multi-step signal where step widths of the multi-step signal are based on half of a period of oscillation of the adjustable mirror 107. The use of the multi-step control signal 121 can reduce ringing of the adjustable mirror 107 and allow for fast linear scanning.

The system 101 is configured so that laser light 105 reflected from the sample 111 is directed to the detector 113. The detector 113 can comprise any means which can be configured to detect the laser light 105 and so enable information to be obtained from the sample 111.

The system 101 can also comprise one or more optical components 109. The optical components 109 can comprise one or more components for directing at least some of the laser light 105 reflected from the adjustable mirror 107 towards the sample 111 so as to enable scanning of the sample 111.

The one or more optical components 109 can comprise any means which can be configured to direct laser light from the sample 111 onto the detector 113. The optical components 109 can comprise one or more optical devices such as one or more fixed mirrors, one or more dichroic mirrors, one or more controllable apertures, an optical lens and/or any other suitable components.

FIG. 2 shows an example apparatus 115 that can be used to provide control signals 121 to the adjustable mirror 107. The control signal 121 can impart a force to the actuators of the adjustable mirror 107 and so control the position of the adjustable mirror 107. The control signal 121 can be configured to allow for linear scanning of the sample 111 while reducing ringing of the adjustable mirror 107.

In the example of FIG. 2 the apparatus 115 comprises a controller 203. The controller 203 can be configured to control the position of the adjustable mirror 107. In some examples the controller 203 can be configured to control other components of the system 101. In the example of FIG. 2 the implementation of the controller 203 can be as controller circuitry. In some examples the controller 203 can be implemented in hardware alone, have certain aspects in software including firmware alone or can be a combination of hardware and software (including firmware).

As illustrated in FIG. 2 the controller 203 can be implemented using instructions that enable hardware functionality, for example, by using executable instructions of a computer program 205 in a general-purpose or specialpurpose processor 117 that can be stored on a computer readable storage medium (disk, memory etc.) to be executed by such a processor 117.

The processor 117 is configured to read from and write to the memory 119. The processor 117 can also comprise an output interface via which data and/or commands are output by the processor 117 and an input interface via which data and/or commands are input to the processor 117.

The memory 119 is configured to store a computer program 205 comprising computer program instructions (computer program code 207) that controls the operation of the apparatus 203 when loaded into the processor 117. The computer program instructions, of the computer program 205, provide the logic and routines that enables the apparatus 115 to perform the methods illustrated in FIGS. 3 and 4. The processor 117 by reading the memory 119 is able to load and execute the computer program 205.

The apparatus 115 therefore comprises: at least one processor 117; and at least one memory 119 including computer program code 207, the at least one memory 119 and the computer program code 207 configured to, with the at least one processor 117, cause the apparatus 115 at least to perform:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

As illustrated in FIG. 2 the computer program 205 can arrive at the apparatus 115 via any suitable delivery mechanism 201. The delivery mechanism 201 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 205. The delivery mechanism can be a signal configured to reliably transfer the computer program 205. The apparatus 115 can propagate or transmit the computer program 205 as a computer data signal. In some examples the computer program 205 can be transmitted to the apparatus 115 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 205 comprises computer program instructions for causing an apparatus 115 to perform at least the following:

providing a control signal to at least one adjustable mirror to control movement of the at least one adjustable mirror where the at least one adjustable mirror is provided within a laser scanning system; wherein the control signal comprises a multi-step signal where step widths of the multi-step signal are based on half of a period of oscillation of the at least one adjustable mirror.

The computer program instructions can be comprised in a computer program 205, a non-transitory computer readable medium, a computer program product, a machine readable medium. In some but not necessarily all examples, the computer program instructions can be distributed over more than one computer program 205.

Although the memory 119 is illustrated as a single component/circuitry it can be implemented as one or more separate components/circuitry some or all of which can be integrated/removable and/or can provide permanent/semi-permanent/dynamic/cached storage.

Although the processor 117 is illustrated as a single component/circuitry it can be implemented as one or more separate components/circuitry some or all of which can be integrated/removable. The processor 117 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 3 and 4 can represent steps in a method and/or sections of code in the computer program 205. The illustration of a particular order to the blocks does not necessarily imply that there is a required or preferred order for the blocks and the order and arrangement of the block can be varied. Furthermore, it can be possible for some blocks to be omitted.

FIG. 3 shows an example method that can be used to design or obtain a control signal 121 for controlling the adjustable mirror 107. The method could be performed by the apparatus 115 as shown in FIGS. 1 and 2.

The method comprises, at block 301, measuring the mechanical resonance of the adjustable mirror 107. Any suitable means can be used to measure the mechanical resonance of the adjustable mirror 107 such as a position sensor and/or a vibrometer.

The mechanical resonance can be determined by the physical properties of the mirror 107 and the actuators of the mirror. For example, the factors that determine the mechanical resonance can comprise the size, shape and weight of the adjustable mirror 107 and the stiffness and length of the spring or other means that are used as actuators.

The adjustable mirror 107 and the actuators of the adjustable mirror can be designed to have a specific resonance. However, there may be some deviation from the designed resonance in the actual resonance. For example, manufacturing tolerances can result in the actual mechanical resonance being different to the designed manufacturing tolerance. Therefore, the actual mechanical resonance can be determined through measurement of the oscillation of the adjustable mirror 107.

The mechanical resonance gives the period of oscillation of the adjustable mirror 107. The period can be used to determine the widths of the steps of the control signal 121. In examples of the disclosure the step widths of the control signal 121 are based on the half period of the oscillation of the adjustable mirror 107. The half period can be determined from the measured mechanical resonance.

At block 303 the method comprises designing the steps of the control signal 121. The steps of the control signal 121 are designed to impart an acceleration or force to the actuators of the adjustable mirror at the measured half periods.

The control signal 121 is designed to have more than two steps. The steps are designed to have step widths based on the half period of the oscillation of the at least one adjustable mirror 107. The step widths determine the duration for which the control signal 121 has a given parameter. The parameter could be voltage, current, or power. In some examples the step widths have a duration that is equal to, or substantially equal to, a half period of the adjustable mirror 107. In some examples the step widths could be based on a multiple of the half period of the adjustable mirror, for example the step widths could comprise an odd integer number of multiples of the half period of the adjustable mirror 107.

The step widths of the control signal could be within a given tolerance range of the half period determined by the mechanical resonance measured at block 301. In some examples the step widths could be within a tolerance range of 2% of the period determined by the mechanical resonance. Other ranges could be used in other examples of the disclosure.

In examples of the disclosure each of the steps within the multi-step signal can have the same step width.

In examples of the disclosure different steps within control signal 121 can have different amplitudes. In such examples at least one step can have a first amplitude and at least a second step can have a second different amplitude. The amplitude of the steps comprises the difference in voltage between adjacent steps of the control signal 121. The amplitude can comprise an increase in the parameter of the control signal or a decrease in the parameter of the control signal. For example, the amplitude can comprise an increase in voltage or a decrease in voltage.

In some examples the steps of the control signal 121 can be formed based on a multi-pulse drive signal. The multi-pulse drive signal can comprise a pulse-width modulated drive signal or any other suitable type of signal.

At block 305 the response of the adjustable mirror 107 to the control signal 121 designed at block 303 is measured. The response can be measured by measuring the scan linearity and velocity uniformity of the adjustable mirror 107 in response to the control signal or by measuring any other suitable parameter.

The measured response is then provided back to the apparatus 115 to enable block 303 to be repeated. This allows the step sizes and/or step widths of the control signal to be adjusted based on the measured response. The use of the feedback loop and block 303 and 305 can be repeated as many times as appropriate. In some examples the use of the feedback loop and block 303 and 305 can be repeated until the measured response attains a threshold parameter.

FIG. 4 shows another example method according to examples of the disclosure. The method could be performed by the apparatus 115 as shown in FIGS. 1 and 2. In some examples the method of FIG. 4 could be performed in conjunction with the method of FIG. 3. In other examples the method of FIG. 3 could be performed and the control signal could be stored in a memory 119 of the apparatus 115 so that the method of FIG. 4 can be performed at a later time.

The method comprises, at bock 401, providing a control signal 121 to at least one adjustable mirror 107 to control movement of the at least one adjustable mirror 107. The at least one adjustable mirror 107 is provided within a laser scanning system 101 such as the system 101 shown in FIG. 1.

The control signal 121 comprises a multi-step signal where step widths of the multi-step signal are based on half of a period of oscillation of the at least one adjustable mirror 107. The control signal 121 can be designed or obtained using the method shown in FIG. 3 or any other suitable method. The control signal 121 can be used to allow for linear scanning of the sample 111. The use of the steps within the control signal 121 reduces the ringing of the adjustable mirror and so allows for faster linear scanning.

FIGS. 5A to 5C shows example control signals 121.

FIG. 5A shows an example in which the control signal is not a multi-step control signal 121. In this example a linear ramp signal is used. In this example the voltage of the control signal 121 increases linearly, or substantially linearly, for the duration of the control signal 121.

The plot 501 shows the motion of the adjustable mirror 107 in response to the control signal 121. FIG. 5A shows that the linear ramp signal causes a ringing response. In this example the ringing response lasts for several resonant lifetimes. This may be the case if the linear ramp is used at frequencies that are close to the resonant frequency of the adjustable mirror 107.

FIG. 5B shows a control signal 121 that comprises a multi-step signal where step widths of the multi-step signal are based on half of a period 503 of oscillation of the at least one adjustable mirror 107. The steps of the control signal 121 are designed to impart an acceleration or force to the actuators of the adjustable mirror 107 to move the adjustable mirror 107 at the measured half periods.

The dashed lines shown in FIGS. 5A to 5C show the half period of the oscillation of the adjustable mirror 107. Any suitable means or process can be used to determine the half period of oscillation of the mirror 107 such as a position sensor and/or a vibrometer.

The control signal 121 shown in FIG. 5B could be obtained using the process as shown in FIG. 3 or any other suitable process.

As shown in FIG. 5B the multi-step control signal 121 comprises a plurality of steps 505. The multi-step control signal 121 comprises more than two steps 505. In the example of FIG. 5B the multi-step control signal 121 comprises eight steps 505. Other numbers of steps 505 can be used in other examples of the disclosure.

In the example of FIG. 5B each of the steps 505 has the same width. Each of the steps 505 has a width that is a half period, or substantially a half period, of the oscillation of the adjustable mirror 107. The half period can be based on the measured oscillations of the adjustable mirror 107.

The amplitudes of the steps 505 can be tuned to reduce the ringing or other unwanted movements of the adjustable mirror 107. In some examples the amplitudes of the steps 505 can be tuned to minimise, or substantially minimise, the ringing of the adjustable mirror 107.

In the example of FIG. 5B different steps within the control signal 121 have different amplitudes. In the example of FIG. 5B each of the steps 505 has a different amplitude. In other examples one or more steps 505 within the control signal 121 could have a first amplitude and one or more steps 505 could have a second, different amplitude.

The control signal 121 can be configured so that the amplitudes of the steps 505 can be adjusted separately to each other. For example, the amplitude of a first step 505 can be adjusted without adjusting the amplitude of other steps 505 within the control signal 121.

The plot 501 of the motion of the adjustable mirror 107 in response to the multi-step control signal 121 shown in FIG. 5B shows significantly less ringing than the motion of the adjustable mirror 107 in response to the linear ramp signal shown in FIG. 5A.

FIG. 5C shows another example control signal 121. In this example the multi-step control signal 121 shown in FIG. 5B has been filtered using a low pass filter. The resulting control signal 121 comprises a smoothed pulse shape where the width of the pulses is based on the half period of oscillation of the adjustable mirror 107.

The use of the low pass filter removes higher frequencies from the control signal 121. This removes even more of the unwanted oscillations of the adjustable mirror 107. The plot 501 of the motion of the adjustable mirror 107 shown in FIG. 5C is more linear and comprises fewer oscillations than the corresponding plot in FIG. 5B.

FIG. 6 shows an example feedback loop 601 that could be used to design the control signal 121. The feedback loop 601 can be implemented using an apparatus 115 as shown in FIGS. 1 and 2 or using any other suitable means.

At block 603 the feedback loop comprises obtaining the resonant steps 505 of the control signal 121. The steps 505 of the control signals 121 can be determined based on the mechanical resonance of the adjustable mirror 107. The output of block 603 comprises a stepped signal 605.

The stepped signal 605 is then provided to a low pass filter 607 so that a smoothed signal 609 is provided.

The smoothed signal 609 is provided to a pulse-width modulation (PWM) conversion module 611 so that the control signal 121 provided to the adjustable mirror 107 is formed based on a multi-pulse drive signal. In this example the multi-pulse drive signal comprises a pulse-width modulated drive signal.

The control signal 121 is then provided to the adjustable mirror 107 in the system 101 so as to control movement of the adjustable mirror 107.

The one or more position sensors 613 can be used to determine the position of the adjustable mirror 107 in response to the control signal. The one or more position sensors 613 can comprise any suitable means. In some examples the one or more position sensors 613 can comprise an image sensor such as a CMOS sensor or any other suitable means. In some examples the one or more position sensors 613 can comprise a vibrometer and/or any other suitable means.

The one or more position sensors 613 provide an output signal 615 comprising an indication of the position of the adjustable mirror 107. The indication of the position of the adjustable mirror 107 provides information relating to ringing or other unwanted motion of the adjustable mirror 107.

The output signal 615 comprising an indication of the position of the adjustable mirror is provided to a feedback correction module 617. The feedback correction module 617 uses the information relating to the ringing or other wanted motion of the adjustable mirror 107 to determine how the resonant steps should be adjusted.

Any suitable parameters of the resonant steps can be adjusted in examples of the disclosure. For example, the step widths can be adjusted and/or the amplitudes of one or more of the steps 505 can be adjusted. The feedback correction module 617 can be configured so that steps 505 can be adjusted separately to other steps 505 within the control signal 121. For example, the amplitude of a first step 505 can be controlled without adjusting the amplitude of second step 505 and/or other steps within the control signal 121.

FIG. 7 shows example results according to examples of the disclosure. FIG. 7 shows three different plots of the results obtained using three different control signals 121. In each of the plots the dashed lines show the control signal 121 that is provided to the adjustable mirror 107 and the solid line shows the corresponding deflection of the adjustable mirror 107. The deflection of the adjustable mirror can be measured using a position sensor or any other suitable means.

In the systems 101 that were used to obtain the data for the plots 701, 703, 705 in FIG. 7 the adjustable mirror 107 was a MEMS mirror that had a mechanical resonance frequency of around 900 Hz.

In the first plot 701 the control signal 121 comprises a linear ramp signal 121. The control signal 121 had a scan speed of 250 Hz. This causes ringing or unwanted motion of the adjustable mirror 107. This unwanted motion would affect the speed at which the adjustable mirror 107 can be driven and so limits the speed at which the system 101 can obtain information from the sample 111.

In the second plot 703 the control signal 121 comprises a multi-step signal where the step widths are based on a half period of oscillation of the adjustable mirror 107. The steps are designed to impart an acceleration or force to the actuators of the adjustable mirror 107 to move the adjustable mirror 107 at the measured half periods.

The use of the multi-step signal reduces the ringing or other unwanted motion of the adjustable mirror 107. The plot 703 shows that the multi-step signal provides a linear, or substantially linear, forward sweep. This is shown in the time-period between 2-4 ms. This provides for improved scanning of the sample 111. This can allow for faster linear scanning of the sample 111 compared to the linear ramp signal.

In the third plot 705, the control signal 121 comprises a filtered multi-step signal. The filter that is used could comprise any suitable low pass filter. The filtering of the multi-step signal removes high frequency components and provides for smoother motion of the adjustable mirror with fewer deflections and/or smaller deflections compared to the use of the un-filtered multi step signal.

In the example of FIG. 7 the plot 705 shows that the filtered multi-step signal provides a linear, or substantially linear, forward sweep and also a linear, or substantially linear, flyback sweep. The flyback sweeps are shown between 0-2 ms and 4-7 ms.

Examples of the disclosure therefore enable a control signal 121 to be provided to an adjustable mirror 107 of a scanning system 101. The control signal 121 drives the adjustable mirror 107 so as to provide smooth motion of the adjustable mirror. This smooth motion can enable high quality images of the sample 111 to be obtained even at high scanning speeds.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Explicitly indicate that features from different examples (e.g. different methods with different flow charts) can be combined, to Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code, the at least one memory and the computer program code configured to, when executed by the at least one processor, cause the apparatus at least to:
   provide a control signal to at least one adjustable mirror to control movement of the at least one adjustable mirror where the at least one adjustable mirror is provided within a laser scanning system;
   wherein the control signal comprises a multi-step signal where step widths of the multi-step signal are based on half of a period of oscillation of the at least one adjustable mirror, and one or more steps of the multi-step signal has a first amplitude and one or more of the steps has a second amplitude that is different from the first amplitude.

2. An apparatus as claimed in claim 1, wherein the computer program code with the at least one processor are further configured to cause the apparatus to:
   determine a period of the oscillation of the at least one adjustable mirror; and
   use the determined period to control the step widths of the control signal.

3. An apparatus as claimed in claim 2, wherein the period of the oscillation is determined based on measurements of mechanical resonance of the at least one adjustable mirror.

4. An apparatus as claimed in claim 1, wherein the control signal comprises more than two steps.

5. An apparatus as claimed in claim 1, wherein the computer program code with the at least one processor are further configured to cause the apparatus to: based on a multi-pulse drive signal, form the control signal.

6. An apparatus as claimed in claim 5, wherein the multi-pulse drive signal comprises a pulse-width modulated drive signal.

7. An apparatus as claimed in claim 1, wherein the step widths of the control signal are half the period of the oscillation of the at least one adjustable mirror.

8. An apparatus as claimed in claim 1, wherein the computer program code with the at least one processor are further configured to cause the apparatus to: use a feedback loop to adjust at least one of: step sizes of the control signal or step widths of the control signal.

9. An apparatus as claimed in claim 8, wherein the computer program code with the at least one processor are further configured to cause the apparatus to: adjust one or more step widths of the control signal separately to one or more other step widths of the control signal.

10. An apparatus as claimed in claim 1, wherein the computer program code with the at least one processor are further configured to cause the apparatus to: filter the control signal before it is provided to the at least one adjustable mirror.

11. An apparatus as claimed in claim 1 wherein based on the movement of the at least one adjustable mirror, the laser scanning system is configured to perform a linear scan.

12. An apparatus as claimed in claim 1 wherein the laser light comprises collimated light.

13. An apparatus as claimed in claim 1, wherein the apparatus is an optical coherence tomography device.

14. An apparatus as claimed in claim 1, wherein the apparatus is a LIDAR device.

15. An apparatus as claimed in claim 1, wherein the adjustable mirror comprises at least one of a microelectro-mechanical system (MEMS) mirror, or a thermally controlled mirror.

16. An apparatus as claimed in claim 1, wherein successive steps in the multi-step signal have widths based on the oscillation half period.

17. An apparatus as claimed in claim 1, wherein the step widths of the multi-step signal are based on half of a period of ringing oscillation of the at least one adjustable mirror.

18. A method comprising:

providing a control signal to at least one adjustable mirror to control movement of the at least one adjustable mirror where the at least one adjustable mirror is provided within a laser scanning system, wherein the control signal comprises a multi-step signal where step widths of the multi-step signal are based on half of a period of oscillation of the at least one adjustable mirror, and one or more steps of the multi-step signal has a first amplitude and one or more of the steps has a second amplitude that is different from the first amplitude.

19. A non-transitory computer readable medium comprising program instructions stored thereon for causing an apparatus to perform at least the following:

providing a control signal to at least one adjustable mirror to control movement of the at least one adjustable mirror where the at least one adjustable mirror is provided within a laser scanning system, wherein the control signal comprises a multi-step signal where step widths of the multi-step signal are based on half of a period of oscillation of the at least one adjustable mirror, and one or more steps of the multi-step signal has a first amplitude and one or more of the steps has a second amplitude that is different from the first amplitude.

20. The non-transitory computer readable medium of claim 19, wherein successive steps in the multi-step signal have widths based on the oscillation half period.

* * * * *